United States Patent [19]

Ackenhusen

[11] Patent Number: 4,847,906

[45] Date of Patent: Jul. 11, 1989

[54] LINEAR PREDICTIVE SPEECH CODING ARRANGEMENT

[75] Inventor: John G. Ackenhusen, Summit, N.J.

[73] Assignee: American Telephone and Telegraph Company, AT&T Bell Laboratories, Murray Hill, N.J.

[21] Appl. No.: 845,447

[22] Filed: Mar. 28, 1986

[51] Int. Cl.[4] .......................... G01L 1/00; G01L 5/00

[52] U.S. Cl. ...................................................... 381/41

[58] Field of Search ......... 381/41, 46 MS, 36, 37 MS; 364/513.5 MS

[56] References Cited

U.S. PATENT DOCUMENTS

| | | | |
|---|---|---|---|
| 3,624,302 | 11/1971 | Atal | 179/1 SA |
| 4,282,405 | 8/1981 | Taguchi | 364/513.5 |
| 4,301,329 | 11/1981 | Taguchi | 381/37 |
| 4,360,708 | 11/1982 | Taguchi et al. | 381/36 |
| 4,401,855 | 8/1983 | Broderson et al. | 381/41 |
| 4,696,039 | 9/1987 | Doddington | 381/46 |

OTHER PUBLICATIONS

*The Bell System Technical Journal*, vol. 60, No. 7, Part 2, 9/81, "Digital Signal Processor: Overview: The Device, Support Facilities, and Applications", J. R. Boddie, pp. 1431–1439.

*Primary Examiner*—Gary V. Harkcom
*Assistant Examiner*—Christopher H. Lynt
*Attorney, Agent, or Firm*—Jack S. Cubert; Wilford L. Wisner

[57] ABSTRACT

A speech analyzer is adapted to produce speech parameter signals from a Pth order autocorrelation analysis of a speech pattern in a digital signal processor. The analyzer includes a plurality of memories of predetermined arrangement to store feature vector signals used in the analysis, a single set of coded signals for controlling the analysis, and a memory address processor for addressing the feature vector signal memories. In each iteration of the analysis, at least one speech parameter signal is produced by the digital signal processor responsive to the same set of control signals and the feature vector memory addressing signals.

3 Claims, 6 Drawing Sheets

LINEAR PREDICTIVE SPEECH CODING ARRANGEMENT

TECHNICAL FIELD

The invention relates to speech analysis and more particularly to arrangements for generating signals representative of acoustic features of speech patterns.

BACKGROUND OF THE INVENTION

Linear predictive coding (LPC) is extensively used in digital speech transmission, automatic speech recognition, and speech synthesis. One such digital speech coding system is disclosed in U.S. Pat. No. 3,624,302 issued to B. S. Atal, Nov. 30, 1971. The arrangement therein includes a linear prediction analysis of input speech in which the speech is partitioned into successive time frame intervals of 5 to 20 milliseconds duration, and a set of parameters representative of the time interval speech is generated. The parameter signal set includes linear prediction coefficient signals representative of the spectral envelope of the speech in the time interval, and pitch and voicing signals corresponding to the speech excitation. These parameter signals are encoded at a much lower bit rate than the speech signal waveform itself and a replica of the input speech signal is formed from the parameter signal codes by synthesis. The synthesizer arrangement comprises a model of the vocal tract in which the excitation pulses of each successive interval are modified by the interval spectral envelope prediction coefficients in an all pole predictive filter.

One well known method for generating speech feature signals involves speech analysis in which the autocorrelation of a time frame portion of a speech pattern are formed. The autocorrelation signals are then processed in accordance with the technique known as Durbin's recursion to generate signals that correspond to LPC coefficients, reflection coefficients, and the prediction residual energy of the time frame interval. While Durbin's recursion signal processing may be readily implemented in large general purpose computers, it is particularly useful to perform these processing operations in a single programmable digital signal processor (DSP) integrated circuit so that the processing equipment is small and economical. As is commonly known, however, the storage capacity in available DSP devices is generally small, and the DSP memory addressing capabilities are severely limited.

Transformation of an autocorrelation vector signal to a representation based on prior art linear prediction coding by the method of Durbin's recursion requires that operands be accessed from three single-dimension vectors and a two-dimension array. These requirements generally exceed the limited arithmetic addressing capability of a typical digital signal processor. As a result, it is necessary to store the signal processing instructions for each iteration of Durbin's recursion separately. Thus, a distinct set of instruction code signals is required for each iteration processing and the distinct sets are stored separately in the control memory of the digital signal processor. This stringing of the separate iteration instruction codes uses a large portion of the program memory and limits the utility of the DSP for speech processing applications. If all iterations required for Durbin's recursion could be performed by a single set of instruction code signals, processing of all iterations could be done by transferring control to a single subroutine occupying a predetermined number of control memory locations whereby DSP speech processing is rendered more efficient and more economical. It is an object of the invention to provide improved digital speech signal processing in real time digital signal processors.

BRIEF SUMMARY OF THE INVENTION

The foregoing object is achieved by utilizing a plurality of data signal memories of predetermined size and arrangement determined by the order of the speech analysis, and sequentially addressing the locations of the signal memories during each iteration of the speech parameter processing. In this way, the memory addressing is performed in single increments and decrements within each iteration by sequentially addressing the location of the data signal memories so that a single set of coded instruction signals may be used for all iterations. As a result, the control memory size is substantially reduced and the memory requirements are independent of the order of the speech pattern analysis.

The invention is directed to an arrangement for analyzing a speech pattern to generate speech parameter signals representative thereof in which a set of speech pattern autocorrelation signals R(i), i=1, 2, . . . , P are formed for each successive time frame interval of a speech pattern. The arrangement includes a memory for storing a fixed number of control signals, a signal processor responsive to said autocorrelation signals and said fixed number of control signals for generating speech parameter signals corresponding to a Pth order analysis of each successive time frame interval speech portion, and a plurality of memories each for storing at least P speech parameter data signals in P successive locations. The signal processor generates a succession of i=1, 2, . . . , P iteration index signals. Responsive to each successive iteration index signal, addressing signals are produced for each of said plurality of memories. The speech parameter data signals are combined responsive to said set of control signals and said addressing signals to form at least one Pth order speech parameter signal.

DETAILED DESCRIPTION

Figure 1:
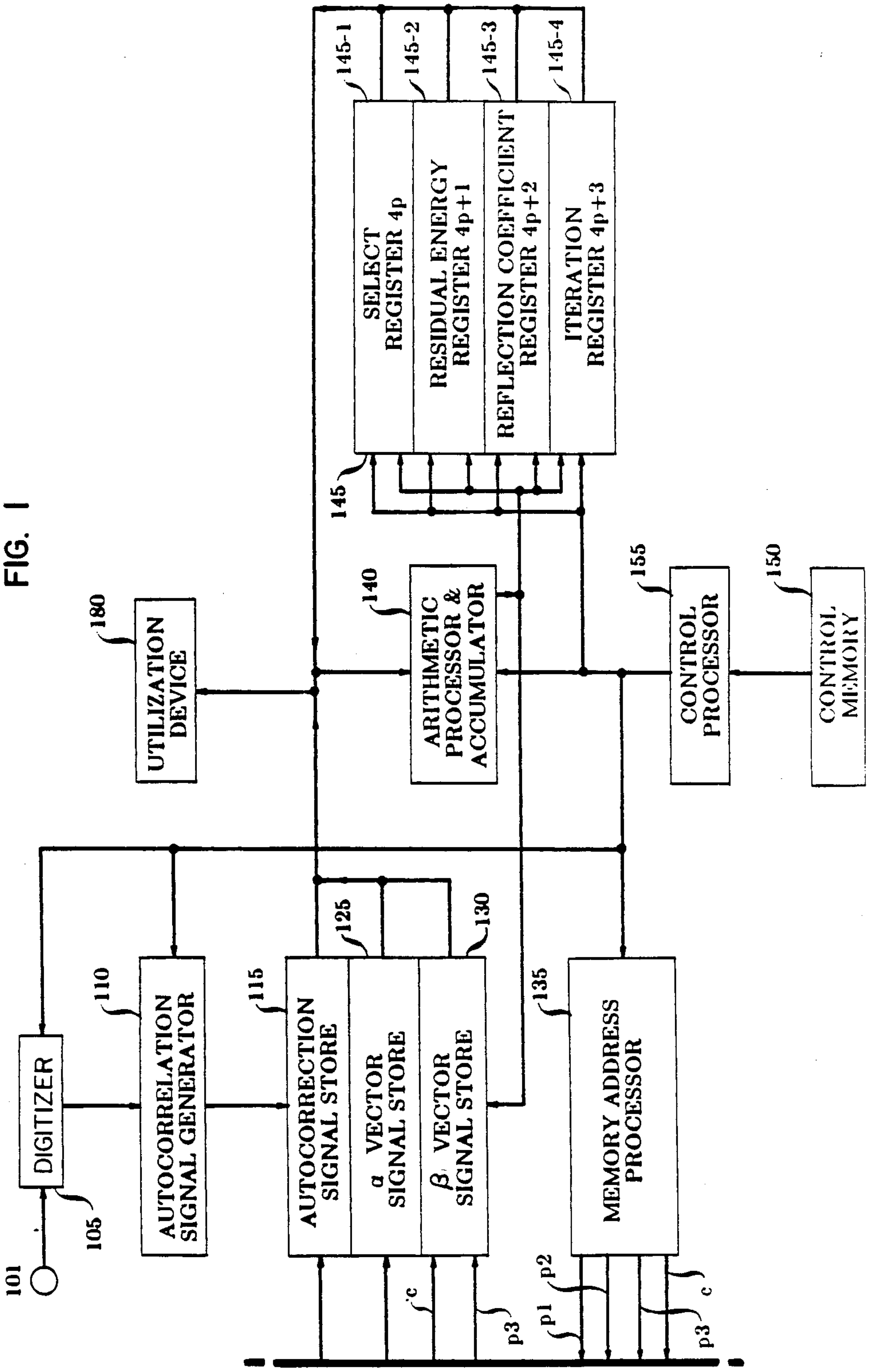
FIG. 1 depicts a block diagram of a speech analysis arrangement illustrative of the invention.

As is well known in the art, speech may be coded in terms of linear predictive parameters by forming a set of autocorrelation signals for each successive time frame interval, e.g., 5 to 20 millisecond period, and processing the autocorrelation signals in accordance with Durbin's recursion. The recursion is performed in a sequence of iterations, each of which results in the generation of speech parameter signals corresponding to the order of the iteration. The processing for each iteration i, i=1, 2, . . . , P, transforms a $P^{th}$-order autocorrelation vector R(n), n=0, 1, 2, . . . , P, into a residual energy signal $E^{(i)}$, a reflection coefficient signal $k_i$, intermediate vector signals $\alpha_j^{(i)}$, j=1 to i−1, and LPC coefficient signal $a_j$.

Durbin's recursion includes the initial formation of a signal:

$$E^{(O)}=R(O) \quad (1)$$

For successive iterations $i=1, 2, \ldots, P$, signals corresponding to Equations 2–5 are formed.

$$s_i = R(i) - \sum_{j=1}^{i-1} a_j^{(i-1)} R(i-j) \quad (2)$$

(For $i=1$ the summation from 1 to 0 is skipped)

$$k_i = \frac{s_i}{E^{(i-1)}} \quad (3)$$

for $j=1$ to $i-1$:

$$a_j^{(i)} = a_j^{(i-1)} - k_i a_{i-j}^{(i-1)} \quad (5)$$

Then the residual energy and LPC coefficient signals of the ith order are generated according to Equations 6–8:

$$E^{(i)} = (1-k_i^2)\,E^{(i-1)} \quad (6)$$

$$E = E^{(P)} \quad (7)$$

$$a_j = a_j^{(P)} \quad (8)$$

As is readily seen from the foregoing equations, each successive iteration differs significantly from the preceding iteration. Consequently, according to prior art arrangements each iteration is processed under control of a different set of stored instruction signals. In particular, the processing corresponding to Equations 2 and 5 requires a different number of steps for each iteration since the number of computations increases for each successive iteration. Equation 2 may be rearranged in the form of a sum of products, $$s_i = R(i) - \sum_{j=1}^{i-1} a_j^{(i-1)} R(i-j) = 1 \cdot R(i) + (-a_1^{(i-1)})R(i-1) + (-a_2^{(i-1)})R(i-2) + \ldots + (-a_i - 1^{(i-1)})R(1)$$

which may be preceded by the series $$0 \cdot R(P-1) + \ldots + 0 \cdot R(i+1) \quad (9)$$

since the sum of this series is zero.

Thus, the sum of Equation 2 can be formed for any iteration $i \leqq P$ by reversing the order of the terms of Equation 9 and generating a vector signal corresponding to:

$$\begin{aligned} s_i = \; & -a_{i-1}^{(i-1)} \cdot R(1) \\ & + -a_{i-2}^{(i-1)} \cdot R(2) \\ & \quad \vdots \\ & + \;\cdot \\ & \quad \vdots \\ & + 1 \cdot R(i) \\ & + 0 \cdot R(i+1) \\ & \quad \vdots \\ & + \;\cdot \\ & \quad \vdots \\ & + 0 \cdot R(P). \end{aligned} \quad (10)$$

This summation expression uses two vector signals of length P of coefficients ordered sequentially in fixed size memory, one beginning with $$-a_{i-1}^{(i-1)},$$

the other beginning with R(1):

$$\begin{array}{lcl} -a_{i-1}^{(i-1)} & & R(1) \\ -a_{i-2}^{(i-1)} & & R(2) \\ -a_{i-3}^{(i-1)} & & R(3) \\ \cdot & & \cdot \\ \cdot & \text{and} & \cdot \\ \cdot & & \cdot \\ -a_1^{(i-1)} & & R(i) \\ 1 & & R(i+1) \\ 0 & & R(i+2) \\ \cdot & & \cdot \\ \cdot & & \cdot \\ \cdot & & \cdot \\ 0 & & R(P) \end{array} \quad (11)$$

Vector signal $[a_j^{(i-1)}, j=i-1, i-2, \ldots, 1]$ has appended thereto the vector signal $[1, 0, \ldots, 0]$ to provide a fixed number of P elements. With this memory arrangement, the summation of Equation 2 becomes the simple scalar product of vector signals $[a_j^{(i-1)}]$ and [R(i)], independent of the iteration count i. The reciprocal of $E^{(i-1)}$ required in Equation 3 may be performed by well-known processing techniques.

The use of data signal memories in accordance with the invention is illustrated with reference to the table of FIG. 2. For purposes of illustration, it is assumed that a signal processor having two operand source address pointers, p1 and p2, and a destination address pointer p3 is utilized. Source address pointers p1 and p2 may be incremented or decremented and point to a multiplier and a multiplicand in memory, respectively. Destination address p3 points to a result storage location and may also be incremented. Section 201 of the leftmost column corresponds to the locations in a memory of predetermined size that stores autocorrelation signals R(0), R(1), . . . , R(P). Section 205 of the leftmost column corresponds to the locations in another memory of predetermined size storing intermediate data signals $$-a_{i-1}^{(i-1)},$$

..., $-\alpha_1^{(i-1)}$, 1, 0, ..., 0.

Figure 2:
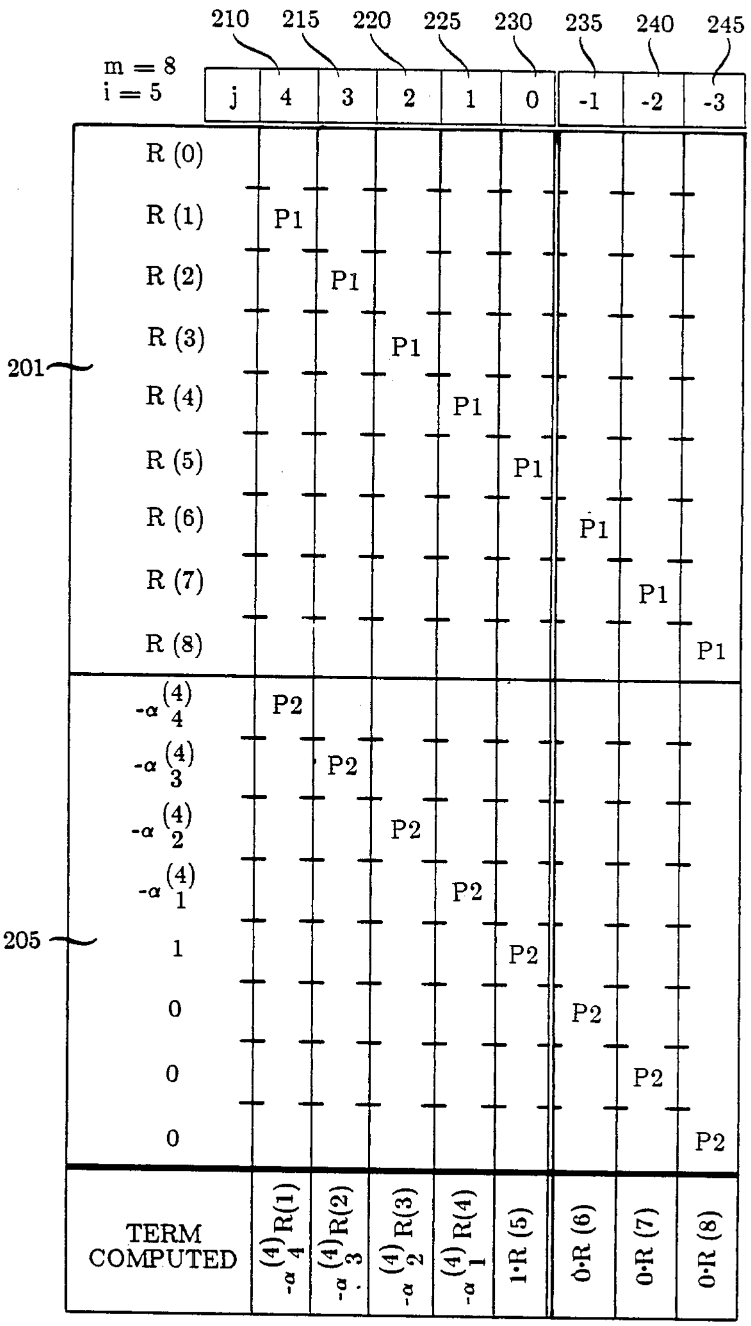
FIGS. 2 and 3 show tables illustrating the addressing of the stores in the arrangement of FIG. 1.

For a typical time frame interval iteration P=8, i=5 in FIG. 2, the successive processing of the terms of Equation 2 as j is decremented from i−1=4 progresses left to right across from column 210 to column 245. Source address pointer p1 is initially set at R(1) and source address pointer p2 is initially set at $-\alpha_4^{(4)}$ to obtain the partial result $-\alpha_4^{(4)}$. R(1) shown at the bottom of the j=4 column 210 in FIG. 2. The source address pointers are then incremented to address the R(2) and $-\alpha_3^{(4)}$ locations of the two fixed size memories as indicated in the j=3 column 215. The regular sequential progression of source address pointers p1 and p2 for processing signals according to Equation 10 is readily seen in the illustration of FIG. 2. The processing indicated in columns 235, 240 and 241 are multiplications using zero valued locations of the α parameter memory to achieve a uniform iteration processing. In accordance with the invention, specified memories are assigned to data vector signals to render the generation of predictive parameter signals independent of the particular iteration being processed.

Figure 3:
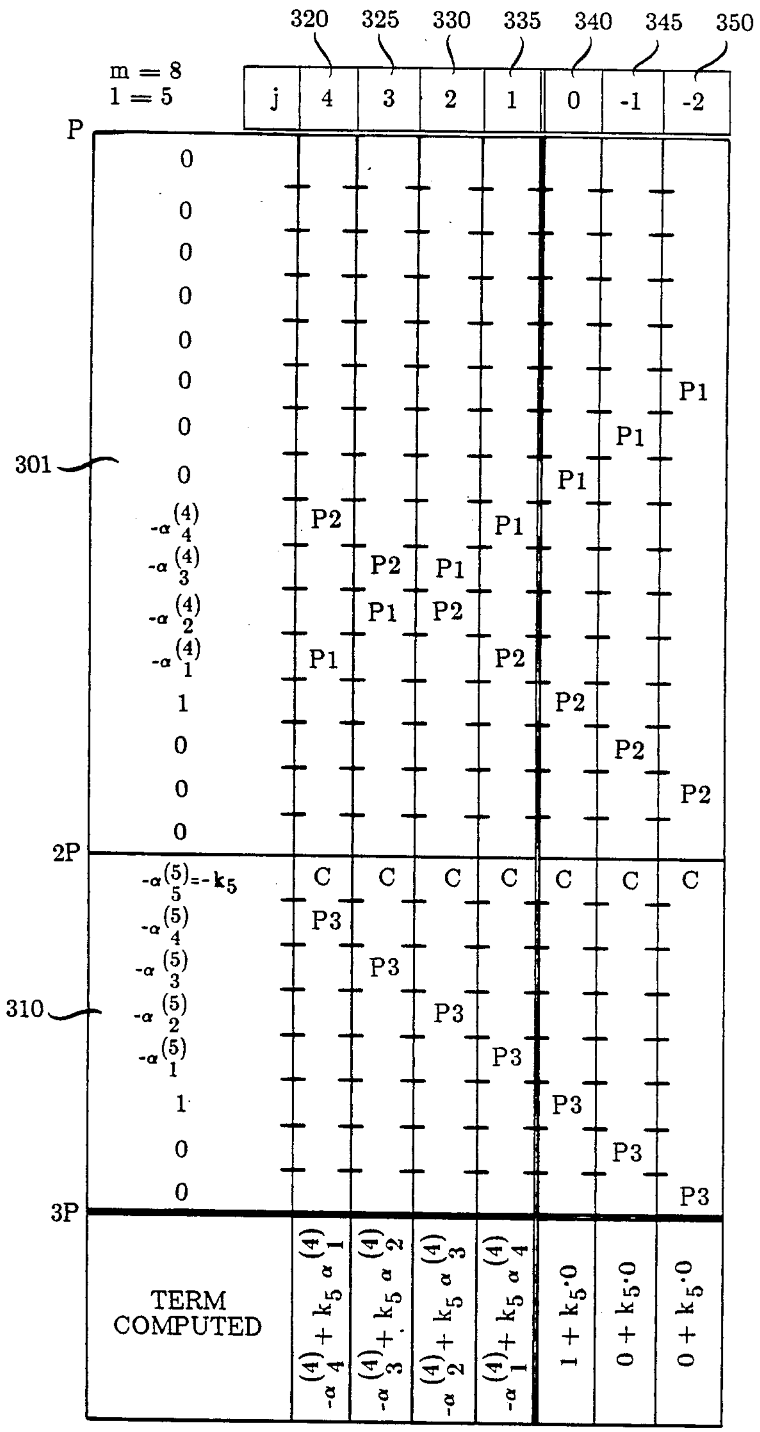

With respect to the signal processing for Equation 5, FIG. 3 illustrates the arrangement of the invention to make the processing uniform for every iteration whereby a single set of instruction code signals may be used. For purposes of illustration, assume an eighth order predictive parameter analysis for a time frame interval in which the fifth iteration is performed. Equation 5 may be transformed as shown in Equations 12–15. These equations are written in reverse order of the index j, j=i−1, i−2, ..., 1:

$$-\alpha_4^{(5)} = k_5 \cdot \alpha_1^{(4)} - \alpha_4^{(4)} \quad (12)$$

$$-\alpha_3^{(5)} = k_5 \cdot \alpha_2^{(4)} - \alpha_3^{(4)} \quad (13)$$

$$-\alpha_2^{(5)} = k_5 \cdot \alpha_3^{(4)} - \alpha_2^{(4)} \quad (14)$$

$$-\alpha_1^{(5)} = k_5 \cdot \alpha_4^{(4)} - \alpha_1^{(4)} \quad (15)$$

In Equations 12–15, the values of $[\alpha_j^{(i)}]$ on the left sides of the equations are addressed in storage in descending order of j and the values of $[\alpha_j^{(i-1)}]$ are addressed in ascending order of j for the first right side term (product with $k_5$) and are addressed in descending order of j in the second right side term. Although only i−1 calculations are required for Equation 5, dummy calculations are appended as with respect to Equation 10 to achieve a regular structure requiring only a single set of instruction code signals. This is done by prefixing the array $[\alpha_j^{(i-1)}]$ with [0, 0, ..., 0] and postfixing the array $[\alpha_j^{(i-1)}]$ with [1, 0, 0, ..., 0]. The processing according to Equation 5 is started with one source address pointer set at $$\alpha_{i-1}^{(i-1)}$$

at the top of the array and the other source address pointer set at the other end of the array ($\alpha_1^{(i-1)}$). The destination pointer is set to address the second location of the destination array for storing the $[\alpha_j^{(i)}]$ values on the left of Equations 12–15. The iterations of Equation 5 are then performed by incrementing the first address pointer, decrementing the second address pointer and incrementing the destination pointer. The offset between these two source address pointers is i−2 and is the only portion of the recursion that changes with iteration index i. For i=1, this pointer actually points one location above the top −α entry of the array memory.

Referring to FIG. 3, the leftmost column is divided into sections 301 and 310. Section 301 corresponds to the successive locations of the α vector signal in store 125 of FIG. 1 at the beginning of the P=8, i=5 iteration. Section 310 corresponds to destination memory 130 for storing the resulting signals of the iteration. The descending succession of j columns 320 through 345 shows the placement of the p1 and p2 source address pointer signals with reference to the memory of section 301. Address pointer signal p3 in the j columns illustrates the addressing of the resulting signal store 130. The bottom row of FIG. 3 indicates the term processed in the j column.

As the iteration progresses through the j=4, 3, 2, 1 sequence, processing corresponding to Equations 12–15 is performed. For any iteration i, the processing begins with p1 pointing i−2 locations into the array. In j=4 column 320 illustrated in FIG. 3 where iteration index i=5, address pointer p1 points to 5−2=3 locations beyond p2. The addressing of column section 301 of FIG. 3 is sequential where address pointer p1 decrements while address pointer p2 increments as the processing proceeds from left to right. The resulting elements of $[\alpha_j^{(i-1)}]$ are entered sequentially in column section 310 as addressed indicated by destination address pointer p3. Constant pointer c provides operand signal k for all values of j.

As shown in FIG. 3, the resultant array in column section 310, $[\alpha_j^{(5)}]$, is appended with the sequence [1, 0, 0, ...] so that the array is aligned with the array of FIG. 2. The P-element array $[\alpha_j^{(5)}]$ is transferred to the memory locations occupied by $[\alpha_j^{(4)}]$ in column section 301 at the end of the iteration. The other processing steps of the recursion iteration after those for Equations 2 and 5 are performed only once for each iteration. The processing continues after the double vertical line to fill the resultant memory locations addressed by pointer p3 with 1, 0, ..., 0 responsive to the locations of section 301 addressed by pointers p1 and p2.

Figure 4:
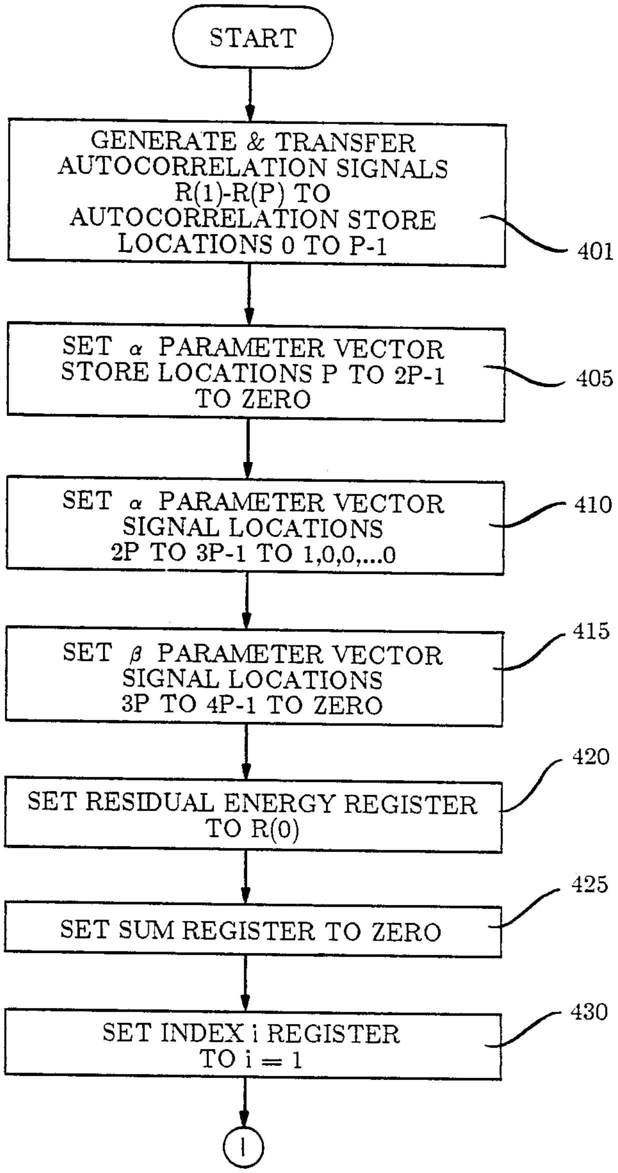
FIGS. 4, 5 and 6 show flow charts illustrating the operation of the arrangement of FIG. 1 to generate speech parameter signals.
Figure 5:
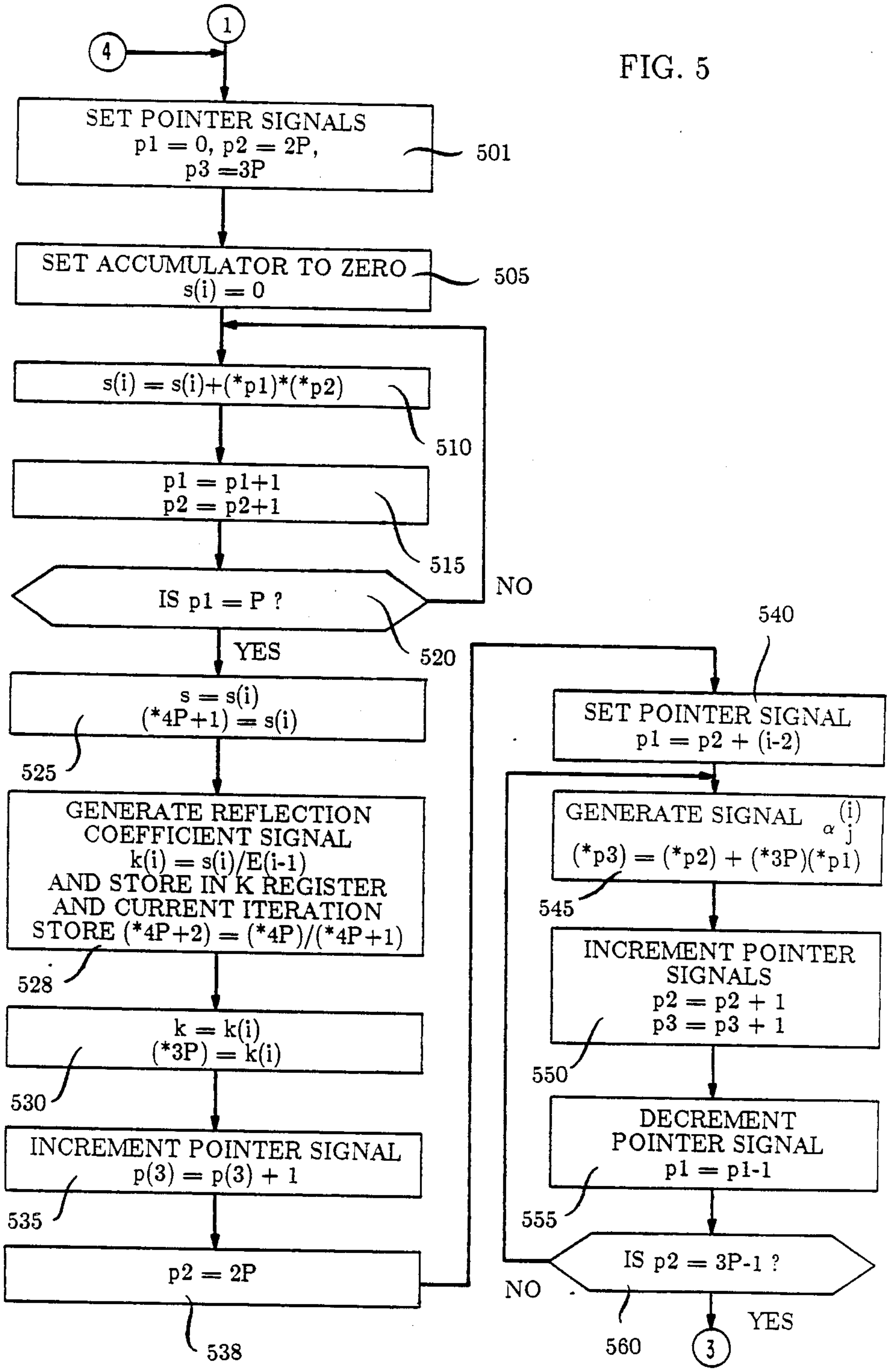
Figure 6:
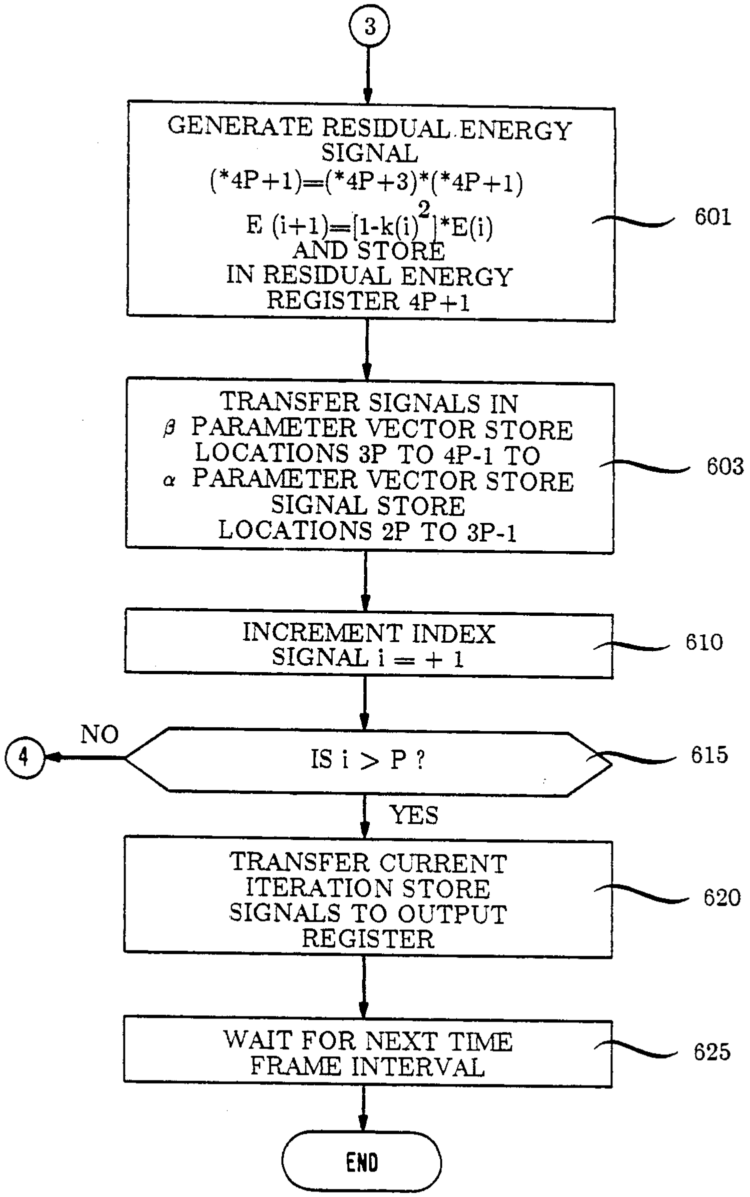

FIG. 1 depicts a circuit arrangement adapted to form linear predictive coding parameter signals for a speech pattern that is illustrative of the invention and FIGS. 4 through 6 depict flow charts illustrating the operation of the arrangement of FIG. 1. Appendix A is a listing in DSP20 language form of the program instruction signals of the control memory of FIG. 1 corresponding to the steps in the flow charts of FIGS. 4–6. The circuit of FIG. 1 may comprise the DSP20 digital signal processor described in the special issue on the "Digital Signal Processor", *Bell System Technical Journal,* Vol. 60, No. 7, Part 2 (September 1981), pp. 1431–1709. In FIG. 1, speech is applied to electro-acoustic transducer 101 wherein it is converted into an electrical signal representative of the speech waveform. The speech signal from transducer 101 is transformed into a sequence of digital codes corresponding to the speech wave form by digitizer 105. The digitizer may, as is well known in the art, comprise a low pass filter to limit the bandwidth of the speech signal, a sampler operative to sample the filtered signal at a predetermined rate and an analog-to-digital converter adapted to produce a digital code for each speech signal sample.

The sequence of speech sample codes from digitizer 105 is partitioned into overlapping time frame intervals each of which may be 45 milliseconds in duration with a 15 millisecond overlap in autocorrelation signal generator 110. A set of autocorrelation signals R(0), R(1), . . . , R(P) are formed for the time frame interval as indicated in step 401 of the flow chart of FIG. 4 and signals R(1), R(2), . . . , R(P) are output to the successive locations 0 to P−1 of the P location autocorrelation store 115 under control of control processor 155. $\alpha$ store 125 is a fixed size 2P location store adapted to store the $\alpha$ parameter vector signals of the time frame interval speech parameter processing. Signal store 130 is a fixed size P location store to store the parameter vector signals of the time frame interval speech parameter processing. Stores 115, 125, and 130 may be in successive locations sections of a common random access data signal memory as shown in FIG. 1 or may be separate memories. The addressing of the locations of stores 115, 125, and 130 is controlled by memory address processor 135 which generates address pointer signals p1, p2, p3, and c to select data signal locations during each iteration of the Durbin's recursion processing.

Arithmetic processor and accumulator 140 receives data signals from memories 115, 125, and 130 as addressed by pointer signals p1, p2 and p3 and forms parameter signals in accordance with Equations 2–8 as controlled by control memory 150. Arithmetic processor 140 includes an accumulator that temporarily stores arithmetic operation results as is well known in the art. The output of processor 140 is sent to parameter store 145 for use in later steps of the recursion processing. Control memory includes a single fixed set of instruction code signals that is applied to control processor 155 to control each iteration of the recursion processing. Instead of storing a different set of control instruction codes for each iteration, the arrangement of FIG. 1 in accordance with the invention uses the same set of instruction codes for every recursion iteration. In this way, the size of the control memory is substantially reduced with the limited data signal memory addressing facilities of economical digital signal processors.

Referring to FIG. 4, the first P locations of $\alpha$ store 125, locations P to 2P−1, are initially set to zero as per step 405; the last P locations of $\alpha$ store 125, locations 2P to 3P−1, are set to 1, 0, . . . , 0 as per step 410; and the P locations of $\beta$ parameter store 130, locations 3P to 4P−1 are set to zero as per step 415. Residual energy register 145-2 at location 4P+1 and sum register 145-1 at location 4P of parameter signal store 145 are set to R(0) and zero, respectively (steps 420 and 425). Iteration index register 145-4 at location 4P+3 is also set to i=1 corresponding to the first iteration of the recursion (step 430).

After the initialization of the recursion memories and registers of steps 405 through 435, the memory addressing pointer signals are initially set to to enable arithmetic processor 140 to generate sum signals s(i) for the current iteration i (step 501 of FIG. 5), in accordance with Equation 10. Source pointer signal p1 which addresses autocorrelation memory 115 is set to zero corresponding to the location in which R(1) is stored. Source address pointer signal p2 which addresses the $\alpha$ vector signal in memory 125 is set to location 2P in which the signal $$\alpha_{i-1}^{(i-1)}$$

is stored. For the first iteration (i=1), this location has been initialized to 1. Destination pointer signal p3 which addresses $\beta$ store 130 is set to the first location 3P of $\beta$ store 130. The accumulator of processor 140 is set to zero (step 505) and the loop including steps 510 through 520 is entered to generate a scalar product signal according to Equation 10.

In step 510, the signal in the location of autocorrelation store 115 addressed by pointer signal p2 (denoted as (*p2)) and the signal in the location of $\alpha$ store 125 addressed by pointer signal p1 (denoted as (*p1)) are applied to arithmetic processor 140 wherein the product signal (*p1)·(*p2) is formed. This product signal representative of $$-\alpha_{i-1}^{(i-1)}\cdot R(1)$$

is then added to the signal s(i) which is in the accumulator of processor 140. Source pointer signals p1 and p2 are incremented as per step 515 and steps 510 and 515 are repeated until pointer signal p1 has reached the P location of the autocorrelation signal store at which time the processing corresponding to Equation 10 for the current iteration is complete. Step 525 is then entered via decision step 520 and the sum signal s(i) is transferred from the accumulator of processor 140 to sum register 145-1 at address 4P of parameter store 145.

Autocorrelation signal store 115 stores the signals $$R(1), R(2), \ldots, R(P)$$

in locations 0, 1, . . . , P−1 and the second half of $\alpha$ store 125 contains signals $$-\alpha_{i-1}^{(i-1)}, -\alpha_{i-2}^{(i-1)}, \ldots, 1, 0, \ldots, 0$$

corresponding to a P element vector signal. The operations of the loop from step 510 through 520 generate the scalar product signal of Equation 10. In accordance with the invention, the arrangement of memory 125 prefixed by 0, . . . , 0, and appended with 1, 0, . . . , 0 values makes the sum signal formation uniform for all iterations i so that the instruction code signals therefor form a single subroutine in control memory 150.

The ith order reflection coefficient signal k(i) is produced by dividing the sum signal in register 145-1 of parameter store 145 by the residual energy signal E(i−1) of the preceding iteration i−1 in control processor 155 (step 528). For this operation, the sum signal in location 4P+1 and the residual energy signal stored in location 4P of parameter store 145 are applied to processor 140. The resulting reflection coefficient signal k(i) from the processor is then stored in location 3P of store 130 (step 528) and in location 4P+2 of store 145 (step 530). At this time, destination pointer signal p3 is incremented to address the next location in memory 130. Source pointer signal p2 is set to address location 2P in store 125 (step 538) and source pointer signal p1 is set to address the i−2 location into store 125 (step 540). The loop including steps 545 through 560 is iterated to generate the P element vector signal $$-\alpha_{i-1}^{(i)}, -\alpha_{i-2}^{(i)}, \ldots, -\alpha_{1}^{(i)}, 1, 0, \ldots, 0$$

In the first pass through step 545, (*p1) is the signal $$-\alpha_{i-4}^{(i-1)},$$

(*p2) is the signal $\alpha_{i-1}^{(i-1)}$ and the signal k(i) is in register 145-3 at location 4P+2. These signals are applied to arithmetic processor 140 and the resulting signal $-\alpha_{i-1}^{(i)}$ therefrom is stored in the location p3=3P+1. Pointer signals p2 and p3 are incremented as per steps 550. Address pointer signal p1 is decremented (555) and address pointer p2 is tested to determine if address 3P−1 has been reached (step 560). These operations are performed in address processor 135 under control of instruction code signals from control memory 140. When p2=3P−1, the P element vector signal $-\alpha_i^{(i-1)}, -\alpha_i^{(i-2)}, \ldots, -\alpha_i^{(1)}, 1, 0, \ldots, 0$ is stored in memory 130 and step 601 of FIG. 6 is entered to generate the residual energy signal E(i+1) of the current time frame interval. The E(i+1) signal is formed in arithmetic processor 140 in accordance with $$*(4P+1)=(1-*(4P+3)^2)\cdot*(4P+1)$$

where location 4P+1 of parameter store 145 contains the residual energy signal E(i) and location 4P+3 of the parameter store contains the reflection coefficient signal k(i). The signals in store 130 corresponding to the results of the current iteration i are then transferred to locations 2P to 3P−1 of store 125 (step 605) preparatory to the next iteration. Iteration index signal i is then incremented (step 610) and the incremented index signal is checked to determine if the final iteration of the time frame interval has been completed (step 615). If not, step 501 of FIG. 5 is reentered for the next iteration. Upon completion of the iterations for the current time frame interval, the final iteration result signals are transferred from store 130 to utilization device 180 which may comprise a speech coder, speech synthesizer or speech recognizer of the types well known in the art (step 620) and the circuit of FIG. 1 is placed in a wait state until the start of the next time frame interval (step 625).

Consider the operation of the arrangement of FIG. 1 in the generation of the LPC parameters of an LPC model of order P=3 for a single time frame interval. The time frame speech pattern portion is transformed into a set of autocorrelation signals R(0), R(1), R(2), R(3). After the initialization steps shown in FIG. 4, autocorrelation store 115 contains signals R(1), R(2), R(3) and does not change during the iteration processing. The first P locations of parameter store 125 are reset to 0, 0, 0 and remain in this state throughout the iterations. The last P locations of parameter store 125 are set to 1, 0, 0. Parameter store 130 is reset to 0, 0, 0. Residual energy store 145-2 contains signal R(0), and iteration index signal store i is set to one.

Just prior to step 545 of FIG. 5 in the first iteration i=1, sum register 145-1 contains the signal s(1). Reflection coefficient register 145-3 stores signal $k(1)=\alpha_1^{(1)}$. Parameter store 125 contains the vector signal 0, 0, 0, 1, 0, 0. Address pointer signals p1 and p2 are set to locations 2P−1 and 2P, of parameter store 125, respectively. The reflection coefficient signal −k(1) is in the first location of $\beta$ store 130 and address pointer signal p3 is set to the second location of store 130.

When step 545 is entered for the iteration i=2, parameter store 125 has been changed to 0, 0, 0, $-\alpha_1^{(1)}$, 1, 0 and $\beta$ store 130 contains the signal $-k(2)=-\alpha_2^{(2)}$ in its first location. Address pointer signals p1 and p2 are both set to the first location of parameter store 125 while pointer signal p3 is set to the second location of store 130. At the same point in the operation of the circuit of FIG. 1 for iteration i=3, store 125 contains the vector signal $-\alpha_2^{(2)}$, $-\alpha_1^{(2)}$, 1 while the first location store 130 has the signal$-k(3)=-\alpha_3^{(3)}$. Address pointer signals p1 and p2 are set to the first and second locations of store 125, respectively, and pointer signal p3 is set to the second location of store 130. At the end of the last iteration, i=4, just prior to step 610 of FIG. 6, parameter store 125 contains the vector signal 0, 0, 0,$-\alpha_3^{(3)}$, $-\alpha_2^{(3)}$, $-\alpha_1^{(3)}$, the last P values of which correspond to the LPC coefficients of the time frame interval.

The invention has been described with reference to illustrative embodiments thereof. It is apparent, however, to one skilled in the art that various modifications and changes may be made without departing from the spirit and scope of the invention.

APPENDIX A

```
/* PREEMPHASIS, WINDOWING, AND AUTOCORRELATION */

ram     zero[4], logen, nr[9], v[9], zer0[2], d0, c30,
        c20,c10, c00, d1, c31, c21, c11, c01, d2, c32,
        c22, c12, c02, w0, w1 w2, n, bx1, bx2, bx3, nxtout,
        mark, xp4, xp3, xp2, xp1, xm0, xm1, xm2, xm3, xm4,
        x0[13], x1[13], x2[13], rh0[18], rh1[18], rh2[18],
        r[18], div[3], ns, nsl, pm2, alph0[7], alphm1[8],
        alpha[8], kr, e, el, er, ac[9];

/*                                                  */
/*                                                  */
/*      MAIN   PROGRAM                              */
/*                                                  */

init:   ioc=0x183;
        lc=255;
```

```
                  a=p   p=0*c;
                  a=p   p=x*w;
         w=a      a=p   p=x*w;
         rda=&zero;
wrt0:    if(lc--!=0)doset();
         goto wrt0;
*rda++=w          a=p   p=x*w;
         auc=0x72;
lpc0:    rd=&n;
         i=1;
                  a=p   p=-1*c;
                  a=p   p=0*c;
         w=a      a=p    p=x*w;
*rd++i=w          w=a  a=p      p=x*w;
         call readr;
         ;
                  a=p   p=x*w;

/*                                                          */
/*       CALCULATE BY COUNTING                              */
/*       RIGHT SHIFTS ON R(00                               */
/*                                                          */

lpc1:    call shiftr;
         rda=&nr[0];
         rya=&r[0];

/*                                                          */
/*       NORMALIZE R(1) THROUGH R(4)                        */
/*                                                          */

lpc2:    rd=&ac[1];
         call acnorm;
         rya=&r[2];
         rda=&nr[1];

/*                                                          */
/*       NORMALIZE R(5) THROUGH R(8)                        */
/*                                                          */

lpc3:    rd=&ac[5];
         call acnorm;
         rya=&r[10];
         rda=&nr[5];

/*                                                          */
/*       INITIALIZATION                                     */
/*                E(0) = R(0)                               */
/*       ZERO ALPHA ARRAYS                                  */
/*                ALPHM1(0) = 1                             */
/*                                                          */

lpc4:    rya=&ac[0];
         rda=&alph0;
         lc=26;
                  a=p   p=0*c;
                  a=p   p=x*w;
         w=a      a=p   p=x*w;
```

```
wr0:    if(lc--!=0)doset();
        goto wr0;
*rda++=w        a=p   p=x*w;
                a=p   p=x*w;
        str=0x01;
        rda=&e;
*rda++=*rya++   rda=&alphm1[0];
        str=0x00;
                a=p   p=16384*c;
                a=p   p=x*w;
        w=a     a=p   p=x*w;
        call update;
*rda=w          a=p   p=x*w;
                a=p   p=x*w;

/*                                                        */
/*      CALCULATE 1/E AND DURBIN ITERATION - I=1          */
/*                                                        */

lpc5:   call shiftr;
        rya=&e;
        rda=&div[0];

/*                                                        */
/*      CALCULATE 1/E AND DURBIN ITERATION - I=2          */
/*                                                        */

lpc6:   call shiftr;
        rya=&e;
        rda=&div[0];
/*                                                        */
/*      CALCULATE 1/E AND DURBIN ITERATION - I=3          */
/*                                                        */
lpc7:   call shiftr;
        rya=&e;
        rda=&div[0];
/*                                                        */
/*      CALCULATE 1/E AND DURBIN ITERATION - I=4          */
/*                                                        */
lpc8:   call shiftr;
        rya=&e;
        rda=&div[0];
/*                                                        */
/*      CALCULATE 1/E AND DURBIN ITERATION - I=5          */
/*                                                        */
lpc9:   call shiftr;
        rya=&e;
        rda=&div[0];
/*                                                        */
/*      CALCULATE 1/E AND DURBIN ITERATION - I=6          */
/*                                                        */
lpc10:  call shiftr;
        rya=&e;
        rda=&div[0];
/*                                                        */
/*      CALCULATE 1/E AND DURBIN ITERATION - I=7          */
/*                                                        */
lpc11:  call shiftr;
        rya=&e;
        rda=&div[0];
```

```
/*                                                              */
/*      CALCULATE 1/E AND DURBIN ITERATION - I=8                */
/*                                                              */
lpc12:  call shiftr;
        rya=&e;
        rda=&div[0];
/*                                                              */
/*      CALCULATE RESIDUAL RECIPROCAL                           */
/*                                                              */
lpc13:  call shiftr;
        rya=&e;
        rda=&div[0];
/*                                                              */
/*      CALCULATE TEST COEFFICIENT VECTOR                       */
/*                                                              */
lpc14:  call test;
        rx=&er;
        rya=&nr[0];
/*                                                              */
/*      FRAME COMPUTATION COMPLETE                              */
/*      -FINISH SAMPLE COMPUTATION                              */
/*                                                              */
nxtlpc: ;
        ;
                a=p     p=*ry++i;
                a=p     p=99*c;
                a=p-a   p=x*w;
        if(a==0)doset();
        goto lpc0;
        rya=&mark;
                a=p     p=x*w;
        call update;
        ;
                a=p     p=x*w;
        goto nxtlpc;
        ;
                a=p     p=x*w;
/*
/*      SAMPLE UPDATE PROGRAM
/*
/*                                                              /
/*                                                              */
/*      OUTPUT:         obuf <- *rya                            */
/*                                                              */
/*      MOVE:   xm3 <- xp1                                      */
/*              xm2 <- xp2                                      */
/*              xm1 <- xp3                                      */
/*              xm0 <- xp4                                      */
/*                                                              */
/*              xp1 <- mtl (ibuf)                               */
/*                                                              */
update: auc=0x01;
output: rya=&n;
        ry=&nxtout;
        rd=&nxtout;
                a=p     p=8*c;
                a=p     p=4**rya;
                a=p+a   p=x*w;
                a=a<<14;
        w=a     a=p     p=x*w;
```

```
*rd++i=w          a=p     p=x*w;
read1:   rda=&xm3;
         syc=1;
         rya=*ry++i;
         j=0;
move:    lc=34;
obuf=*rya         rya=&xp1:
                        p=mtl1(ibufy);
         k=-1;
*rda--=*rya--     auc=0x72;
*rda--=*rya--           a=p     p=mtl2();
*rda--=*rya--           a=p+a   p=x*w;
*rda--=*rya--     w=a   a=p     p=x*w;
*rda=w   rda=&x2[12];
/*                                                  */
/*       ROTATE:        x2[12] <- x2[8]             */
/*                x2[11] <- x2[7]                   */
/*                x2[10] <- x2[6]                   */
/*                   .                              */
/*                   .                              */
/*                   .                              */
/*                x2[4] <- x2[0]                    */
/*                x2[3] <- x1[12]                   */
/*                x2[2] <- x1[11]                   */
/*                   .                              */
/*                   .                              */
/*                   .                              */
/*                x0[5] <- x0[1]                    */
/*                x0[4] <- x0[0]                    */
/*                                                  */
         rya=&x2[8];
rotate:  if(lc--!=0)doset();
         goto rotate;
         ry=&xm4;
*rda--=*rya--           a=p     p=x*w;
         rd=&xm3;
/*                                                  */
/*       PREEMP:        xm3' <- xm3 - (15/16)xm4    */
/*                xm2' <- xm2 - (15/16)xm3          */
/*                xm1' <- xm1 - (15/16)xm2          */
/*                xm0' <- xm0 - (15/16)xm1          */
/*                xm4  <- xm0                       */
/*                                                  */
preemp:  ;
                  a=p   p=15565**ry++k;
                  a=p   p=16384**ry++j;
                  a=p-a p=x*w;
         w=a      a=p   p=15565**ry++k;
*rd++k=w          a=p   p=16384**ry++j;
                  a=p-a p=x*w;
         w=a      a=p   p=15565**ry++k;
*rd++k=w          a=p   p=16384**ry++j;
                  a=p-a p=x*w;
         w=a      a=p   p=15565**ry++k;
*rd++k=w          a=p   p=16384**ry++j;
                  a=p-a p=x*w;
         w=a      a=p   p=x*w;
*rd++k=w                rd=&xm4;
```

```
*rd++k=*ry++j   lc=3;

          ry=&xm3;
          rd=&x0[3];
/*                                                                        */
/*        WINDOW:         for j = 3 to 0 step -1                          */
/*                        n <- n + 1                                      */
/*                        bx = (2*pi/299)(n-d0)                           */
/*                  w0 <- c03*bx3 + c02*bx2 + c01*bx1 + c00               */
/*                  w1 <- c13*bx3 + c12*bx2 + c11*bx1 + c10               */
/*                  w2 <- c23*bx3 + c22*bx2 + c21*bx1 + c20               */
/*                        x0[j] <- w0*xm(j)                               */
/*                        x1[j] <- w1*xm(j)                               */
/*                        x2[j] <- w2*xm(j)                               */
/*                  next j                                                */
/*                                                                        */
window:   rya=&n;
          rda=&n;
                    a=p      p=1*c;
                    a=p      p=16384**rya;
                    a=p+a    p=x*w;
          w=a       a=p      p=x*w;
*rda=w    rx=&d0;
          i=19;
          k=-18;
          rda=&bx1;
                    a=p    p=*rx++i*c;
                    a=p    p=16384**rya;
                    a=p-a p=x*w;
          w=a       a=p    p=x*w;
                    a=p    p=.02101*w;
                    a=p    p=x*w;
                    a=a<<18;
          w=a       a=p    p=x*w;
*rda++=w                   a=a<<14;
          w=a       a=p    p=x*w;
                    a=p    p=x*w;
                    a=p    p=*rx*w;
                    a=p    p=x*w;
          w=a       a=p    p=x*w;
*rda++=w                   rya=&bx2;
                    a=p    p=*rx++k*w;
                    a=p    p=x*w;
          w=a       a=p    p=x*w;
*rda--=w  k=-13;
          rda=&w0;
          i=14;
                    a=p     p=*rx++*w;
                    a=p     p=*rx++**rya--;
                    a=p+a   p=*rx++**rya++;
                    a=p+a   p=*rx++*c;
                    a=p+a   p=*rx++**rya++;
          w=a       a=p     p=x*w;
                    a=p     p=16*w;
                    a=p     p=*rx++**rya--;
                    a=a<<14;
          w=a       a=p     p=*rx++**rya--;
*rda++=w            a=p+a   p=*rx++**rya++;
                    a=p+a   p=*rx++*c;
```

```
                a=p+a  p=x*w;
        w=a     a=p    p=*rx++**rya++;
                a=p    p=16*w;
                a=p    p=*rx++**rya--;
                a=a<<14;
        w=a     a=p    p=*rx++**rya--;
*rda++=w              a=p+a  p=*rx++**rya++;
                a=p+a  p=*rx++*c;
                a=p+a  p=x*w;
        w=a     a=p    p=x*w;
                a=p    p=16*w;
                a=p    p=x*w;
                a=a<<14;
        w=a     a=p    p=x*w;
*rda++=w              rx=&w0;
        i=13;
        k=-27;
                a=p   p=*rx++**ry++j;
                a=p   p=*rx++**ry++j;
        w=a     a=p   p=*rx**ry++i;
*rd++i=w        w=a  a=p    p=x**ry++i;
*rd++i=w        w=a  a=p    p=x**ry++k;
*rd++k=w        if(lc--!=0)doset();
                goto window;
        ;
        i=1;
/*                                                            */
/*      READ2:  xp2 <- mtl (ibuf)                             */
/*                                                            */
/*                                                            */
/*      ACUP:   for j=0,8                                     */
/*                                                            */
/*      r0[j] <- r0[j] + ((sum from k=0 to 8) x0[k]*x0[k-j])    */
/*      r1[j] <- r1[j] + ((sum from k=0 to 8) x1[k]*x1[k-j])    */
/*      r2[j] <- r2[j] + ((sum from k=0 to 8) x2[k]*x2[k-j])    */
/*                                                            */
/*              next j                                        */
/*                                                            */
/*      READ3:  xp3 <- mtl (ibuf)                             */
/*                                                            */
        k=-3;
        rd=&xp2;
                a=p    p=0*c;
                       p=mtl1(ibufy);
                a=p    p=mtl2();
                a=p+a  p=x*w;
        w=a     a=p    p=x*w;
*rd++i=w              auc=0x02;
        j=-2;
        rda=&mark;
        rx=&x0[0];
        ry=&x0[0];
                a=p   p=-2*c;
                a=p   p=x*w;
        w=a     a=p   p=x*w;
*rda=w  goto autoup;
        rya=&rh0[0];
        rd=&rh0[0];
j1:     goto autoup;
```

```
          rya=&rh1[0];
          rd=&rh1[0];
j2:       goto autoup;
          rya=&rh2[0];
          rd=&rh2[0];
/*                                                              */
/*                                                              */
autoup:   lc=8;
autol:    ;
          ;
                          p=*rya++;
                   a=p    p=1**rya++;
                   a=p+a  p=*rx++**ry++i;
                   a=p+a  p=*rx++**ry++i;
                   a=p+a  p=*rx++**ry++i;
                   a=p+a  p=*rx++k**ry++j;
                   a=p+a  p=0x3fff*c;
          w=a      a=a<<14;
*rd++i=w                a=p&a;
          if(lc--!=0)doset();
          goto autol;
          w=a      a=p    p=x*w;
*rd++i=w                a=p     p=x*w;
          ry=&mark;
          ;
          rd=&mark;
                   a=p    p=*ry++j;
                   a=p    p=1*c;
                   a=p+a;
          w=a;
*rd++i=w                if(a<0)doset();
          goto j1;
          rx=&x1[0];
          ry=&x1[0];
          if(a==0)doset();
          goto j2;
          rx=&x2[0];
          ry=&x2[0];
          j=0;
          rd=&xp3;
                   a=p    p=0*c;
                          p=mtl1(ibufy);
                   a=p    p=mtl2();
                   a=p+a  p=x*w;
          syc=1;
          w=a      a=p    p=x*w;
*rd++i=w                auc=0x72;
          rd=&xp4;
/*                                                              */
/*        READ4:   *rd <- mtl (ibuf)                            */
/*                                                              */
read4:    ry=&n;
                          p=mtl1(ibufy);
                   a=p    p=mtl2();
                   a=p+a  p=x*w;
          return;
          w=a      a=p    p=x*w;
*rd++i=w                a=p     p=x*w;
```

```
/*                                                                    */
/*      SUBROUTINES USED IN FRAME RECURSION PROGRAM*/
/*                                                                    */
/*                                                                    */
/*                                                                    */
/*      READR:  if (c32>0) j=2, rx <- &hwin2                          */
/*              if (c32<0) j=1, rx <- &hwin1                          */
/*              if (c32=0) j=0 rx <- &hwin0                           */
/*              for k=0 to 16 step 2                                  */
/*                      r(k) <- rh(j,k)                               */
/*                      rh(j,k) <- 0                                  */
/*                      r(k+1) <- rl(j,k)                             */
/*                      rl(j,k) <- 0                                  */
/*              next k                                                */
/*                                                                    */
/*              for k=0 to 12                                         */
/*                      xj(k) <- 0                                    */
/*                      next k                                        */
/*                                                                    */
readr:  rya=&c32;
        rda=&r[0];
                a=p     p=x*w;
        w=a     a=p     p=*rya;
                a=p     p=x*w;
        if(a>0)doset();
        goto rd2;
        rx=&hwin2;
        k=-66;
        if(a<0)doset();
        goto rd1;
        rx=&hwin1;
        k=-61;
        rx=&hwin0;
        k=-56;
rd0:    goto read;
        rya=&rh0[0];
        rd=&rh0[0];
rd1:    goto read;
        rya=&rh1[0];
        rd=&rh1[0];
rd2:    rya=&rh2[0];
        rd=&rh2[0];
read:   lc=16;
readac: if(lc--!=0)doset();
        goto readac;
*rda++=*rya++   a=p     p=x*w;
*rd++i=w        a=p     p=x*w;
        auc=0x73;
        i=1;
*rda++=*rya++   a=p     p=x*w;
*rd++k=w        lc=12;
zx:     if(lc--!=0)doset();
        goto zx;
*rd++i=w        a=p     p=x*w;
                a=p     p=x*w;
/*                                                                    */
/*      COPWIN:         d0 <- hwin(j)                                 */
/*              c30 <- hwin(j) +1                                     */
/*                                                                    */
```

```
/*                    .                                                  */
/*                    .                                                  */
/*                    c12 <- hwin(j)+13                                  */
/*                    c02 <- hwin(j)+14                                  */
/*                                                                       */
copwin:   lc=15;
          rda=&d0[255];
copl:     w=a;
*rda++=w            if(lc--!=0)doset();
          goto copl;
                    a=p   p=*(rom+rx++i)*c;
                    a=p   p=x*w;
          goto update;
          auc=0x72;
                    a=p   p=x*w;
/*                                                                       */
/*        ACNORM - left shift 4 autocorrelation coefficients             */
/*                 the number of shifts specified in nsl;                */
/*                 write result in &rda++                                */
/*                                                                       */
acnorm:   ry=&nsl;
          rx=&count[3];
normac:   auc=0x72;
          k=-1;
          lc=*ry++j;
                    a=p   p=*rya++;
                    a=p   p=1**rya++;
                    a=p+a   p=0**rya;
                    a=p+a/2   p=x*w;
                    a=p+a/8   p=x*w;
lshift:   if(lc--!=0)doset();
          goto lshift;
                    a=p+2*a   p=x*w;
                    a=p+a     p=x*w;
          a=p+2*a;
          a=p+2*a;
          w=a       a=p+a/8   p=x*w;
*rd++i=w                  a=p+a/2   p=*(rom+rx++k)*c;
          w=a       a=p   p=x*w;
*rda++=w            if(a>0)doset();
          goto normac;
                    a=p   p=x*w;
                    a=p   p=x*w;
          goto update;
          ;.
                    a=p   p=x*w;
/*                                                                       */
/*        SHIFTR: e <- *rya                                              */
/*                e' <- e                                                */
/*                count=12                                               */
/*                e' <- e'/(2**12)                                       */
/*                                                                       */
/*                shftr:  e' <- e'/2                                     */
/*                        count <- count + 1                             */
/*                        if (e' > 0) go to shftr                        */
/*                                                                       */
/*                shiftl: en <- e * 2**(30 - count)  (1 <= en < 2)*/
/*                                                                       */
/*                *rda <- en                                             */
```

```
/*              ns (*rd) <- 16 * count                              */
/*              nsl (*rd + 1) <- 16 * (31 - count)                  */
/*              lmant = INT(4*(en - 1.0))                           */
/*              logen (*rd + 2) <- 4*count + lmant                  */
/*                                                                  */
/*              if (sample count = 3) return                        */
/*                                                                  */
/*              recip: calculate 1/en  (Daugherty)                  */
/*                                                                  */
/*              rshft: nsr <- (nsl/16) - 20                         */
/*                     er <- (1/en) * (2**nsr)                      */
/*                                                                  */
shiftr:    auc=0x02;
           rx=&count[12];
           ry=&count;
                    a=p   p=0*c;
                    a=p   p=*rya++;
           w=a      a=p   p=1**rya--;
                    a=p+a   p=0**rya;
                    a=p+a/8 p=x*w;
                    a=p+a/8 p=x*w;
                    a=p+a/8 p=x*w;
                    a=p+a/8 p=x*w;
           a=p+a/8 p=x*w;
           a=p+a/2 p=x*w;
shftr:     if(a>0)doset();
           goto shftr;
           auc=0x03;
                    a=p+a/2 p=*rx++i*w;
           rd=&ns;
           k=-1;
                    a=p   p=*(rom+rx++j)*c;
                    a=p   p=31*c;
           w=a      a=p-a p=x*w;
*rd++i=w            w=a  a=p     p=x*w;
*rd++i=w            ry=&nsl;
           auc=0x72;
                    a=p   p=x*w;
           lc=*ry++k;
                    a=p   p=*rya++;
                    a=p   p=1**rya--;
                    a=p+a   p=0**rya;
                    a=p+a/2 p=x*w;
                    a=p+a/8 p=x*w;
shftl:     if(lc--!=0)doset();
           goto shftl;
                    a=p+2*a p=x*w;
           rya=&n;
           rd=&ac[0];
                    a=p+2*a;
                    a=p+2*a;
           w=a      a=p+a/8 p=x*w;
*rd++i=w            a=p+a/2 p=x*w;
           rd=&logen;
           w=a      a=p+a   p=0x3000*c;
*rda=w              a=p&a   p=0*c;
           w=a      a=p   p=x*w;
                    a=p   p=4096**ry++i;
                    a=p    p=4*w;
```

```
                        a=p+a   p=x*w;
            w=a         a=p     p=x*w;
*rd++i=w                a=p   p=x*w;
                              p=*rya;
                        a=p   p=3*c;
                        a=p-a p=x*w;
            if(a<0)doset();
            goto recip;
            rda=&ns;
            ry=&div[0];
            goto update;
recip:      auc=0x03;
            rda=&div[0];
            rx=&div[0];
            ;
                        a=p   p=16**ry++j;
                        a=p   p=x*w;
                        a=a<<14;
            w=a         a=p   p=x*w;
*rda=w                  a=p   p=x*w;
                        a=p   p=x*w;
                        a=p   p=1.5*c;
*rda++=y                a=p   p=-0.5**ry++i;
                        a=p+a   p=x*w;
            w=a         a=p   p=x*w;
                        a=p   p=*rx++*w;
                        a=p   p=1.0*w;
            w=a         a=p   p=0*c;
                        a=p+2*a p=-2.0*c;
*rda++=w                      w=a     a=p       p=-1.0*w;
*rda--=w                a=p-a p=x*w;
            w=a         a=p   p=x*w;
            rd=&ns;
                        a=p   p=*rx++*w;
                        a=p   p=*rx--*w;
            w=a         a=p   p=-2.0*c;
*rda++=w                      w=a     a=p       p=-1.0*w;
*rda--=w                a=p-a p=x*w;
            w=a         a=p   p=x*w;
            ry=&ns;
                        a=p   p=*rx++*w;
                        a=p   p=*rx--*w;
            w=a         a=p   p=0*c;
                        a=p+a/2 p=x*w;
*rda++=w                w=a  a=p     p=*rx--*w;
*rda--=w                a=p     p=*rx++*w;
                        a=p   p=1.0*c;
                        a=p-a   p=x*w;
                        a=a<<14 p=w;
            w=a         a=p   p=*rx++*c;
            w=a         a=p   p=*rx--*w;
                        a=p   p=x*w;
            w=a         a=p   p=1.0*abs(w);
                        a=p   p=1*w;
                        a=p+a   p=24*c;
            w=a         a=p   p=*ry++j;
                        a=p-a p=w;
            w=a         a=p   p=0*c;
```

```
*rd++j=w                     a=p+2*a p=x*w;
                       a=p+2*a p=x*w;
                       a=p+a   p=x*w;
         lc=*ry++j;
rshft:   if(lc--!=0)doset();
         goto rshft;
                       a=p+a/2 p=x*w;
         rda=&er;
         if(a>0)doset();
         goto recdun;
         auc=0x71;
         rya=&n;
         ;

         ;
                       a=p   p=16384*c;
                       a=p   p=x*w;
                       a=a<<18;
recdun:  w=a;
*rda=w   ry=&pm2;
/*                                                        */
/*       DURBIT: Durbin's Recursion                       */
/*               (iteration-independent)                  */
/*                                                        */
/*               calculate iteration number from sample index */
/*                                                        */
durbit:  rd=&pm2;
                       a=p   p=88*c;
                       a=p   p=4**rya;
                       a=p-a p=x*w;
                       a=a<<14;
         w=a           a=p   p=x*w;
*rd++i=w               a=p   p=x*w;
/*                                                        */
/*       SUM:          sum=0                              */
/*                     for j=8 to 1 step -1               */
/*                           sum=sum+nr(j)*alphm1(j-1)    */
/*                           next j                       */
/*                                                        */
sum:     rx=&ac[8];
         rya=&alphm1[7];
         rda=&kr;
         j=*ry++i;
                       a=p   p=*rx--**rya--;
                       a=p   p=*rx--**rya--;
                       a=p+a   p=*rx--**rya--;
                       a=p+a   p=*rx--**rya--;
                       a=p+a   p=*rx--**rya--;
                       a=p+a   p=*rx--**rya--;
                       a=p+a   p=*rx--**rya--;
                       a=p+a   p=*rx--**rya--;
                       a=p+a   p=0*c;
         rx=&kr;
                       a=p+2*a p=x*w;
                       a=p+2*a p=x*w;
         w=a           a=p   p=x*w;
*rda=w   ry=&er;
         ;
         ;
```

```
/*                                                              */
/*        KRCALC:       kr=sum*er                               */
/*                                                              */
krcalc:              a=p   p=*rx**ry++i;
                     a=p   p=0*c;
                     a=p+8*a p=x*w;
                     a=p+8*a p=x*w;
                     a=p+2*a p=x*w;
                     a=p+a p=x*w;
          w=a        a=p   p=x*w;
*rda=w    rda=&alpha[0];
/*                                                              */
/*        WRITEK:       alpha[0] <- kr                          */
/*                                                              */
          rda=&alpha[0];
          auc=0x72;
                     a=p   p=*rx*c;
                     a=p   p=0*c;
                     a=p-a p=x*w;
          w=a        a=p   p=x*w;
*rda=w    ry=&alphm1[0];
/*                                                              */
/*        ALPHIT: for j=1 to 7                                  */
/*                   alpha[j] <- alphm1[j-1] - kr*alphm1[i-j+1] */
/*                      next j                                  */
/*                                                              */
alphit:   rya=&alphm1[0];
          rd=&alpha[1];
                     a=p   p=*ry++j;
                     a=p   p=*rx**ry++k;
                     a=p   p=1.0**rya++;
                     a=p-a p=*rx**ry++k;
          w=a        a=p   p=1.0**rya++;
                     a=p-a p=*rx**ry++k;
*rd++i=w             w=a  a=p    p=1.0**rya++;
                     a=p-a p=*rx**ry++k;
*rd++i=w             w=a  a=p    p=1.0**rya++;
                     a=p-a p=*rx**ry++k;
*rd++i=w             w=a  a=p    p=1.0**rya++;
                     a=p-a p=*rx**ry++k;
*rd++i=w             w=a  a=p    p=1.0**rya++;
                     a=p-a p=*rx**ry++k;
*rd++i=w             w=a  a=p    p=1.0**rya++;
                     a=p-a p=x*w;
*rd++i=w             w=a  a=p    p=x*w;
*rd++i=w             rd=&alphm1[0];
          auc=0x73;
/*                                                              */
/*        XFERAL:for j=0 to 7                                   */
/*                      alphm1[j] <- alpha[j]                   */
/*                                                              */
          ry=&alpha[0];
                     a=p   p=x*w;
                     a=p   p=x*w;
*rd++i=*ry++i              a=p    p=x*w;
*rd++i=*ry++i              a=p    p=x*w;
*rd++i=*ry++i              a=p    p=x*w;
*rd++i=*ry++i              a=p    p=x*w;
*rd++i=*ry++i        a=p   p=x*w;
```

```
*rd++i=*ry++i   ry=&kr;
*rd++i=*ry++i          a=p     p=x*w;
*rd++i=*ry++i   rd=&e;
/*                                                              */
/*        ECALC:  e <- (1 - kr*kr) * e                          */
/*                                                              */
ecalc:            a=p   p=x*w;
                  a=p   p=x*w;
                  a=p   p=*rx++**ry++i;
                  a=p   p=16384*c;
                  a=p-a p=*rx**rya;
        w=a       a=p   p=x*w;
                  a=p   p=*rx*w;
                  a=p   p=x*w;
        goto update;
        w=a       a=p   p=x*w;
*rd++i=w          a=p   p=x*w;
/*                                                              */
/*        TEST:   for j=0 to 8                                  */
/*                       v(j) <- nr(j) * (1/e) * (2**m(j))      */
/*                                                              */
/*                where m(j) =  0, 0 <= j <= 3                  */
/*                      m(j) = -1, 4 <= j <= 5                  */
/*                      m(j) = -2, j=6                          */
/*                      m(j) = -3, j=7                          */
/*                      m(j) = -4, j=8                          */
/*                                                              */
test:   rda=&v[0];
        ;
                       a=p     p=x*w;
                       a=p     p=*rx**rya++;
                       a=p     p=x**rya++;
                  w=a  a=p     p=x**rya++;
*rda++=w          w=a  a=p     p=x**rya++;
*rda++=w          w=a  a=p     p=x**rya++;
*rda++=w          w=a  a=p     p=0*c;
                       a=p+a/2 p=x*w;
                       a=p+a   p=x*w;
*rda++=w          w=a  a=p     p=*rx**rya++;
*rda++=w               a=p     p=0*c;
                       a=p+a/2 p=x*w;
                  w=a  a=p     p=x*w;
*rda++=w               a=p     p=*rx**rya++;
                       a=p     p=0*c;
                       a=p+a/2 p=x*w;
                       a=p+a/2 p=*rx**rya++;
                  w=a  a=p     p=0*c;
*rda++=w               a=p+a/8 p=*rx**rya++;
                  w=a  a=p     p=0*c;
*rda++=w               a=p+a/8 p=x*w;
                       a=p+a/2 p=x*w;
        goto update;
                  w=a  a=p     p=x*w;
*rda++=w               a=p     p=x*w;
/*                                                              */
/*        HAMMING WINDOW TAYLOR SERIES COEFFICIENTS             */
/*                                                              */
hwin1:  50;.06652;.11430;-.02495;.31140;
```

```
hwin0:   50;-.06652;.11430;.02495;.31140;
hwin2:   50;0.0;-.20438;0.0;1.00;
         50;.06652;.11430;-.02495;.31140;
         50;-.06652;.11430;.02495;.31140;
/*                                                        */
/*       COUNT:  table to translate address pointer to    */
/*               count value                              */
/*                                                        */
count:   0;1;2;3;4;5;6;7;8;9;10;11;12;13;14;15;16;17;18;19;
         20;21;22;23;24;25;26;27;28;29;30;31;32;33;34;35;36;
```

What is claimed is:

1. A method of speech analysis, of the type comprising the steps:

receiving successive time frame interval portions of a speech pattern;

generating a set of autocorrelation signals R(0), R(1), . . . , R(P) corresponding to the present time frame interval speech pattern portion in response to the present time frame interval portion of said speech pattern; and generating a set of linear predictive parameter signals for said present time frame interval in response to said autocorrelation signal set;

said linear predictive parameter signal set generating step comprising; employing Durbin's recursion, as follows:

for successive iterations i=1, 2, . . . , P, generating signals $$s_i = R(i) - \sum_{j=1}^{i-1} a_j^{(i-1)} \cdot R(i-j)$$

where j is a subordinate index varying from 1 to i−1 within each iteration, and $a_j^{(i-1)}$ is an intermediate signal initially generated from a initial reflection coefficient k, where $k=s_i/E^{(i-1)}$ and $e^{(i-1)}$ is a residual energy signal from the previous iteration which intermediate signal is to be iteratively developed into a linear predictive coefficient $a_j=a_j^{(P)}$ and $$a_j^{(i)} = a_j^{(i-1)} - k_i a_{i-j}^{(i-1)}$$

said method being particularly characterized in that the generating step includes generating signals for appended calculations to make each portion of each iteration repetitive of a set of arithmetic operations, so that j varies from P to 1 in each iteration, the generating step (as in FIG. 2) including storing the autocorrelation signals for successive access for each change of the value j from P to 1 for the first signal $s_i$;

storing (as in FIG. 3) the intermediate values in the order of generation in the previous iteration and continuing through appended values equal in number to P minus the i value for said previous iteration but having P appended values equal to zero in sequence from the first value and in the opposite order, the intermediate values being sequentially accessed in the order of generation for the generation of the first term of the second signal and being sequentially accessed in the inverse order of generation for the generation of the second term of the second signal for values of j from P to 1 in each iteration;

said storing step including replacing the stored intermediate values with new values for the next iteration involving the next higher value of i in like order without affecting (P−i) nearest appended values preceding the first generated value for the previous iteration, where i is the i value of the previous iteration;

and separately accessing (as in FIG. 2) the values of the intermediate signals in the order of generation in the previous iteration and continuing through appended values equal in number to P minus the i value for said previous iteration, said appended values being appropriate for successive access for each change of the value j from P to 1 in each iteration for the generation of the first signal $s_i$, the separately accessing step including replacing said stored intermediate values with new values in the order of generation after each completion iteration for a particular value of i, so that one less appended value is stored at the start of each new iteration.

2. A method of the type claimed in claim 1, said method being further characterized in that the first intermediate value signal storing step comprises storing, as the appended values, the values 1, 0, 0, . . . 0, where the zeros number P+1−i.

3. A method of the type claimed in claim 1 or claim 2, said method being further characterized in that the step of generating the first and second signals includes the steps of temporarily storing (as in section 310 of FIG. 3) the second signal values as j progresses from P to 1.

* * * * *